United States Patent
Hutchinson

(10) Patent No.: US 6,745,028 B1
(45) Date of Patent: *Jun. 1, 2004

(54) SATELLITE MOBILE TELEPHONE CELL DEPARTURE PREDICTION

(75) Inventor: Benjamin H. Hutchinson, Rockville, MD (US)

(73) Assignee: ICO Services Limited, London (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/893,980

(22) Filed: Jul. 16, 1997

(51) Int. Cl.[7] ............................................. H04B 7/185
(52) U.S. Cl. ....................................... 455/427; 455/429
(58) Field of Search ................................ 455/421, 427, 455/428, 429, 430, 12.1, 13.1, 13.2

(56) References Cited

U.S. PATENT DOCUMENTS

| | | | | |
|---|---|---|---|---|
| 5,161,248 A | * | 11/1992 | Bertiger et al. | 455/440 |
| 5,367,304 A | * | 11/1994 | Jan et al. | 455/13.1 |
| 5,408,237 A | * | 4/1995 | Patterson et al. | 455/428 |
| 5,432,842 A | * | 7/1995 | Kinoshita et al. | 455/440 |
| 5,444,450 A | * | 8/1995 | Olds et al. | 455/427 |
| 5,483,664 A | * | 1/1996 | Moritz et al. | 455/13.1 |
| 5,500,648 A | * | 3/1996 | Maine et al. | 455/13.2 |
| 5,551,058 A | * | 8/1996 | Hutcheson et al. | 455/429 |
| 5,551,624 A | * | 9/1996 | Horstein et al. | 455/12.1 |
| 5,561,838 A | * | 10/1996 | Chandos et al. | 455/13.1 |
| 5,574,660 A | * | 11/1996 | Diekelman | 455/13.1 |
| 5,678,174 A | * | 10/1997 | Tayloe | 455/13.1 |
| 5,790,954 A | * | 8/1998 | Tayloe et al. | 455/429 |
| 5,822,680 A | * | 10/1998 | Stuart et al. | 455/12.1 |
| 5,871,181 A | * | 2/1999 | Mass | 455/12.1 |
| 5,952,969 A | * | 9/1999 | Hagerman et al. | 342/457 |
| 6,072,768 A | * | 6/2000 | Wiedeman et al. | 340/7.25 |
| 6,192,240 B1 | * | 2/2001 | Tayloe et al. | 455/428 |
| 6,587,687 B1 | * | 7/2003 | Wiedeman | 455/428 |

FOREIGN PATENT DOCUMENTS

| | | |
|---|---|---|
| EP | 0546758 A | 6/1993 |
| EP | 0655871 A | 5/1995 |
| WO | WO 9613946 A | 5/1996 |

OTHER PUBLICATIONS

Hu et al, "Adaptive Location Management Scheme For Global Personal Communications", OEE Proceedings: Communications, vol. 144, No. 1, Feb. 1977, pp. 54–60, XP000687135.

* cited by examiner

Primary Examiner—Richemond Dorvil
Assistant Examiner—Martin Lerner
(74) Attorney, Agent, or Firm—Michael J. Donohue; Davis Wright Tremaine LLP

(57) ABSTRACT

A mobile station in a satellite mobile telephone system predicts when it will move into another cell on the basis of one set of broadcast information thereby reducing the overall processing burden. The mobile station can predict with a useful degree of certainty which broadcast control channel (BCCH) frequencies it should listen on when it wakes up on the basis of a stored map of the relative positions of cells. The broadcast information includes information about the current cell's shape and translational and rotational motion.

26 Claims, 10 Drawing Sheets

SATELLITE MOBILE TELEPHONE CELL DEPARTURE PREDICTION

FIELD OF THE INVENTION

The present invention relates to the prediction of the time when a mobile station will depart a cell of a satellite mobile telephone system.

BACKGROUND TO THE INVENTION

Known satellite mobile telephone systems include the Inmarsat-M system, the IRIDIUM™ system described in, for example EP-A-0365885, the ICO™ system described in, for example, GB-A-2295296 and the ODYSSEY™ system described in, for example, EP-A-0510789. Whilst each of these systems is cellular in nature, they differ from terrestrial systems in that the cells move relative to the Earth's surface because each cell is defined by a beam from an orbiting satellite.

To extend battery life during the idle mode of a satellite mobile telephone, the mobile telephone is desirably powered down for 95% to 98% of the time. Periodically, the mobile telephone wakes up briefly to determine if broadcast control channels from satellites can be received. If so the mobile telephone checks for an incoming call. In idle mode, the mobile telephone needs to know when to hand over to another beam from the same or a different satellite, i.e. when to start listening to another broadcast control channel.

If a mobile telephone does not know the time of the next handover or the new broadcast control channel, it must frequently search a number of frequencies, for example 8. In particular, if on wake-up the broadcast control channel is found to be weak or absent, the mobile telephone has no way of knowing whether the signal is being blocked or interfered with or whether it is now being serviced by another beam.

It is desirable for a mobile telephone to check only two or three broadcast control channel frequencies (one from a primary satellite and one or two from secondary satellites) instead of all possible frequencies. This minimises "on time" during each wake-up while maintaining the desired low duty cycle. Frequent wake-ups are desirable to minimise the time taken to detect incoming calls and the return of signals after an outage.

It is an aim of the present invention to overcome this problem.

SUMMARY OF THE INVENTION

Briefly stated, in a system according to the present invention, a mobile station predicts when it will move into another cell on the basis of one set of broadcast information thereby reducing the overall processing burden.

According to the present invention, there is provided a method of operation of a satellite mobile telephone system in which a plurality of cells move across the surface of the Earth as a satellite orbits, the method comprising the steps of: providing a mobile station with information related to the movement of a cell relative to the Earth's surface; and determining at the mobile station a prediction for the time when the mobile station will leave said cell on the basis of said received information. The method may involve providing the information to the mobile station by broadcasting the information from a satellite to a cell, the information defining the geographical position of the cell, and receiving said information for the cell at the mobile station.

According to the present invention, there is also provided satellite mobile telephone system comprising transmitting means for transmitting control data in a control channel, wherein the control data comprises geographical information defining the position of a cell associated with the control channel.

According to the present invention, there is further provided a mobile telephone for a satellite mobile telephone system, including memory means for storing control data including geographical information related to the movement of a cell across the Earth's surface and processing means for processing said information to make a prediction of when the mobile station will depart the current cell. The mobile station may include receiving means for receiving said geographical data, wherein said data relates to the cell in which the mobile station is located.

Although the mobile station must perform some numerical calculations, these are not burdensome compared with repeated scanning of all broadcast control channel frequencies.

If the cells differ in size or shape, the information preferably includes information regarding the extent of the cell. However, the mobile station may include information regarding the size and shape of each cell and, in this case, the information need only include the identity of the cell in which the mobile station is located. The designer of a system according to the present invention will be expected to make a design choice balancing the conflicting requirements of transmission capacity and mobile station complexity.

If the shape of the cell is unchanging, or the mobile station stores information regarding the shapes of cells, the information will include information regarding the traversing of the cell over the Earth's surface. In a system in which the cells rotate relative to the Earth's surface, the information will preferably include information regarding rotational movement of the cell.

If the mobile station is provided in advance with no geographical information regarding the cell, the information preferably comprises latitude and longitude co-ordinate values for the centre of the cell, a vector defining the traversing of the cell over the surface of the Earth, co-ordinate values for the vertices of the cell relative to the centre of the cell, at least one vector value defining rotation of the cell as it traverses the surface of the Earth and a time value.

Preferably, the information comprises a set of translational vectors defining the traversing of the cell over the surface of the Earth during predetermined sub-periods of a period during which said information remains unchanged. The information may similarly comprise a set of vectors defining the rotation of the cell. If the sub-periods are relatively short, it may be sufficient for the mobile station merely to identify the sub-period during which it will leave the cell. However, it is preferred that the mobile station derive a particular time, either by identifying a point within one of the sub-periods or directly from the received information.

As a by product of the prediction of the cell departure time, the mobile station will determine a prediction for the cell that it will be entering. Accordingly, the mobile station can identify the control channels that it should monitor after departing a cell.

Since a network will often be aware of a mobile station's location and the movement of cells across the Earth, the mobile station preferably only need re-register with the network if its prediction is not correct, indicating that the mobile station has moved. Accordingly, there is preferably a step of determining at the mobile station the correctness of the prediction and performing a network registration process for the mobile station in dependence on said determined correctness.

DESCRIPTION OF PREFERRED EMBODIMENTS

Preferred embodiments of the present invention will now be described, by way of example, with reference to the accompanying drawings.

Figure 1:
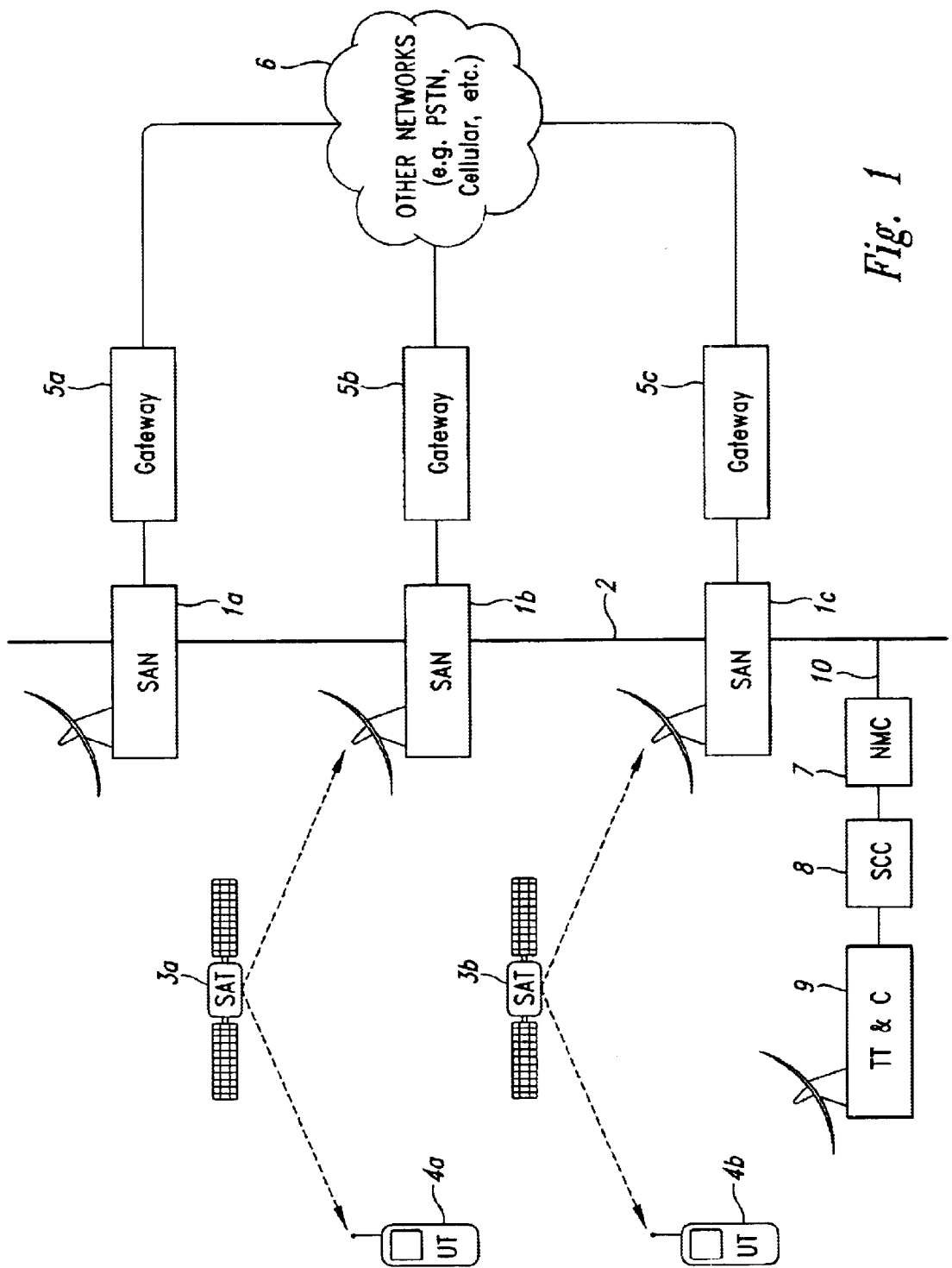
FIG. 1 is a schematic diagram of the physical components of a satellite mobile telephone system.

Referring to FIG. 1, a satellite mobile telephone system comprises a plurality of satellite access nodes (SAN) 1a, 1b, 1c interconnected by a high capacity digital network 2 (hereinafter "the backbone network"), a plurality of satellites 3a, 3b, a plurality of a mobile telephones (UT) 4a, 4b, gateways 5a, 5b, 5c providing connections between the SANs 1a, 1b, 1c and other networks 6, a network management centre (NMC) 7, a satellite control centre (SCC) and a tracking, telemetry and control station (TT&C) 9. The NMC 7, the SCC 8 and the TT&C 9 are interconnected by a lower capacity digital network 10 which is also connected to the backbone network 2. The other networks 6 comprise the public switched telephone network (PSTN), cellular telephone networks and the like.

The SCC 8 and the TT&C 9 control the operation of the satellites 3a, 3b, for instance setting transmit power levels and transponder input tuning, as directed by the NMC 7. Telemetry signals from the satellites 3a, 3b are received by the TT&C 9 and processed by the SCC 8 to ensure that the satellites 3a, 3b are functioning correctly.

During a telephone call, a UT 4a, 4b communicates with a satellite 3a, 3b via a full duplex channel comprising a downlink channel and an uplink channel. The channels comprise TDMA time slots on a frequencies allocated on initiation of the call.

The satellites 3a, 3b are in non-geostationary orbits and comprise generally conventional satellites, such as the known Hughes HS601 model, and may include features as disclosed in GB-A-2288913. Each satellite 3a, 3b is arranged to generate an array of beams, one for each cell, covering a footprint beneath the satellite, each beam including a number of different frequency channels and time slots.

Figure 2:
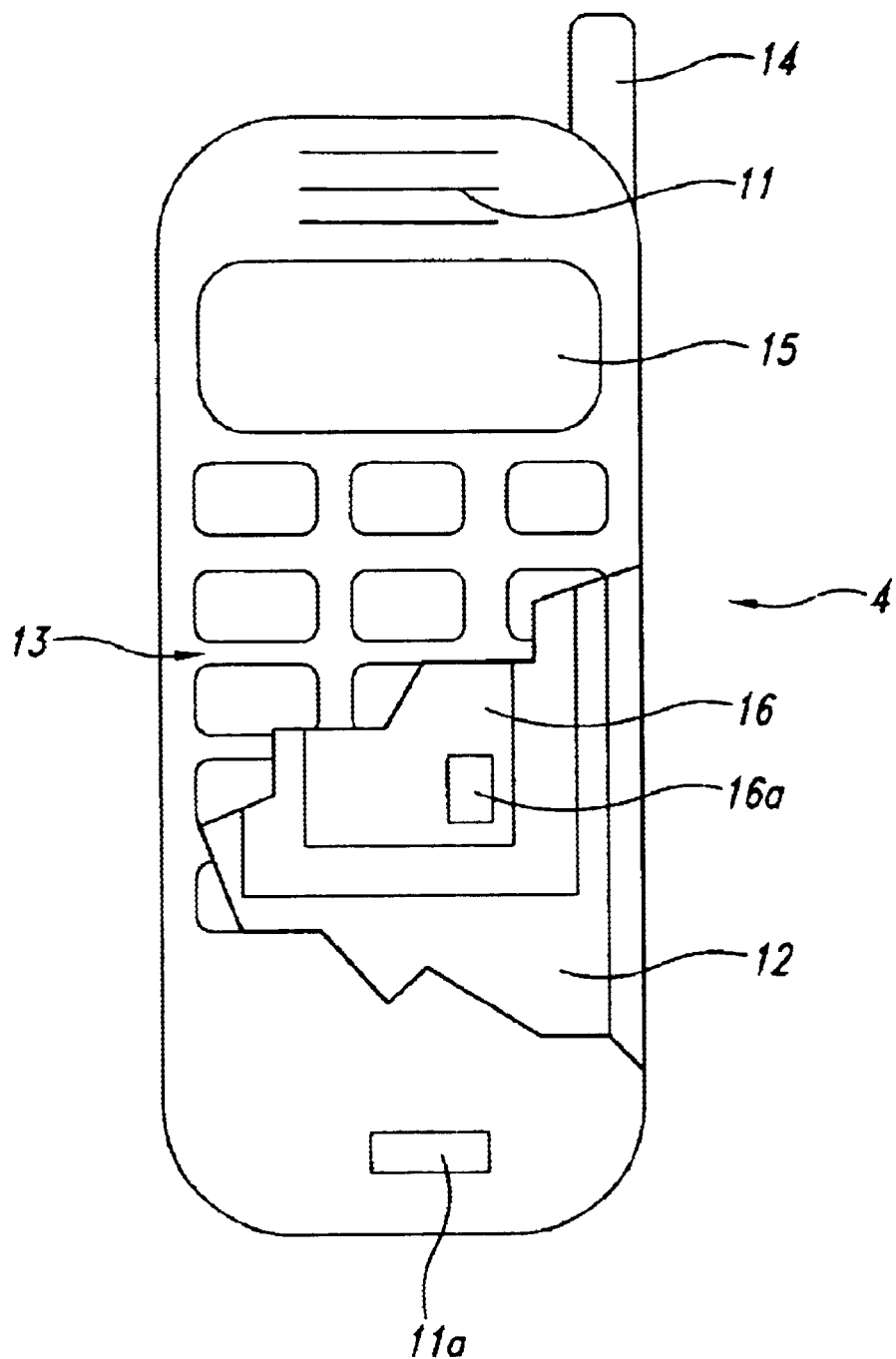
FIG. 2 shows a mobile telephone partially cut away.

Referring to FIG. 2, a UT 4 is generally similar to the units presently available for GSM networks and comprises a codec, a controller 16, a microphone 11a, a loudspeaker 11, a battery 12, a keypad 13, a radio frequency interface, an antenna 14, a display 15 and subscriber identification module (SIM) smart card.

The codec comprises a low bit-rate coder, which generates a speech bit stream at 3.6 kbits/s, together with a channel coder, which applies error correction codes to the speech bit stream to produce an encoded bit stream at 4.8 kbits-s. The low bit-rate coder is a linear predictive coder. The channel coder uses Viterbi coding. The codec also comprises complementary decoders.

The controller 16 comprises a microprocessor and RAM 16a and ROM memory. The microprocessor operates in accordance with a control program stored in the ROM memory. The controller can exchange control and telemetry data with a SAN 1 using the radio frequency interface.

The SIM includes a processor and a non-volatile memory which stores data identifying the subscriber and data for use in encrypted communication.

Figure 3:
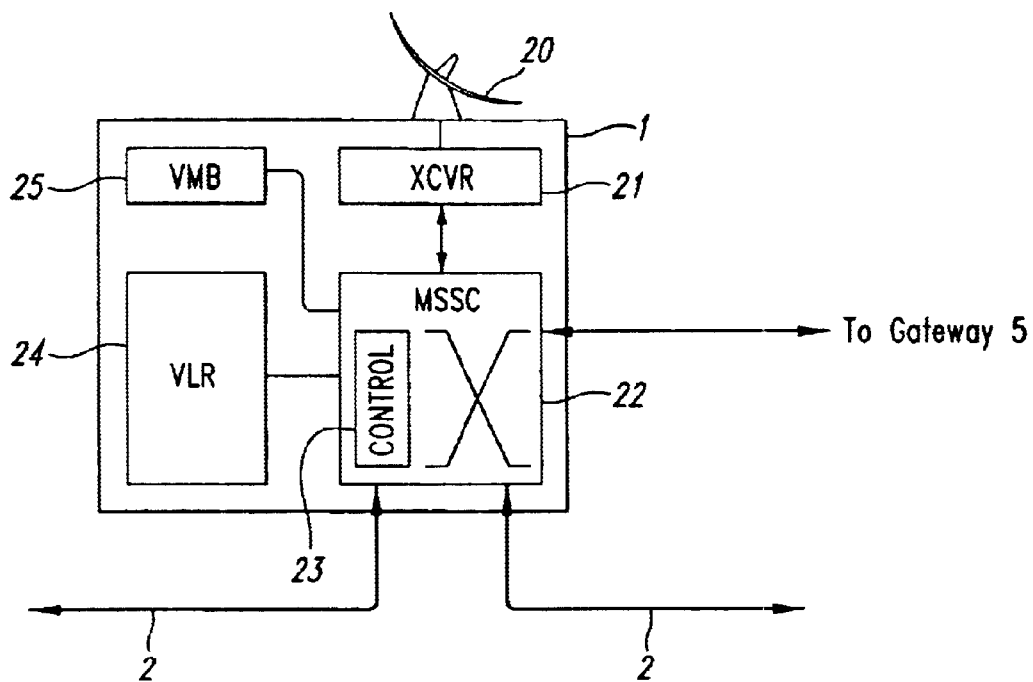
FIG. 3 is a schematic diagram of a satellite access node as shown in FIG. 1.

Referring to FIG. 3, a SAN 1 comprises a dish antenna 20 mounted for tracking satellites, transmitter and receiver circuits 21 including amplifiers, multiplexers, demultiplexers and codecs, a mobile satellite switching centre (MSSC) 22 including a controller 23, a visitor location register database (VLR) 24 and a voice mail box unit (VMB) 25. The MSSC 22 is coupled for communications signals to the backbone network 2, to a gateway and to the transmitter and receiver circuits 21. The controller 23 is coupled for data signals to the VLR 24 and the VMB 25 and may also send and receive data signals via the backbone network 2.

The controller 23 responds to addresses on incoming communications signals, from the antenna 20, the gateway and the backbone network 2, by controlling the MSSC 22 to output the communications signals on the appropriate paths to their destinations, i.e. the antenna 20, the gateway or the backbone network 2.

The VLR 24 maintains a record of each of the subscribers registered with the SAN 1. The VMB 25 provides storage space for voice mail messages for subscribers.

Figure 4:
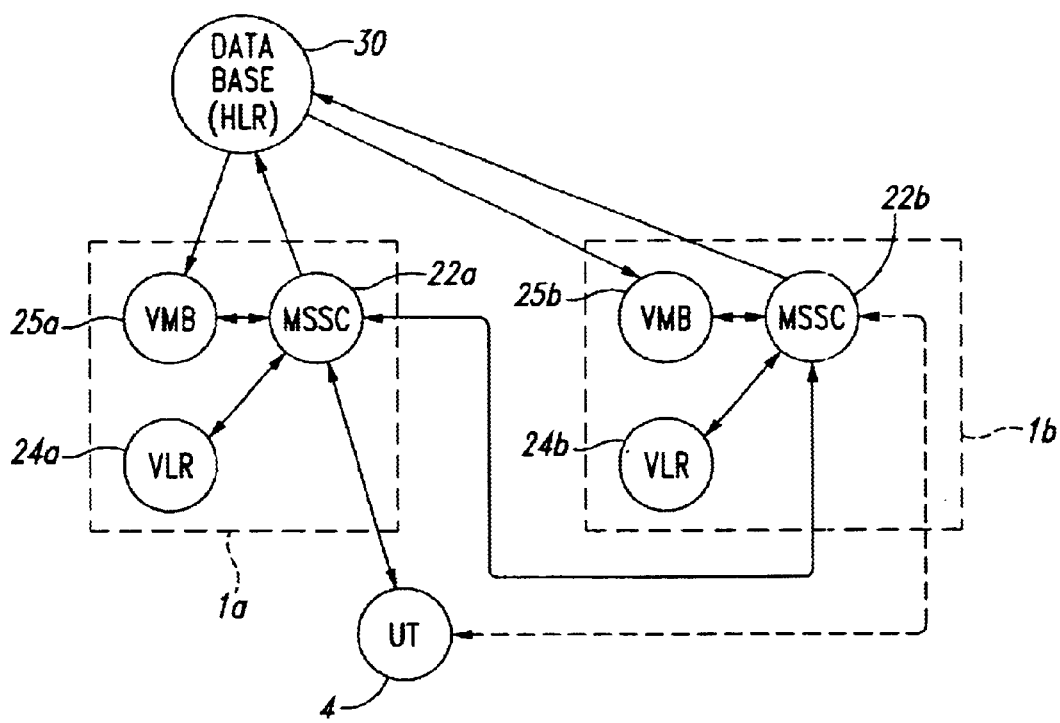
FIG. 4 is a data flow diagram for the system shown in FIG. 1.

Referring to FIG. 4, a database 30, called the home location register (HLR), contains records relating to each UT 4. The record contains the UT's identity (International Mobile Subscriber Identity or IMS), the current status of the UT (whether it is "local" or "global" as will be described in greater detail below), the geographical position of the UT, the home MSSC 22a with which the UT is registered (to enable billing and other data to be collected at a single point), the currently active SAN 1a with which the UT is in communication via a satellite, an individual encyphering key and the address of an associated VMB 25a location. If the UT 4 registers with the other SAN 1b, its HLR record is copied to the VLR 25b at that SAN 1b.

The HLR 30 may be located in the NMC 7 (see FIG. 1) or may be distributed among the SANs 1a, 1b, 1c (see FIG. 1). Referring to FIGS. 1 to 4, a UT 4 may be registered with one of two distinct statuses; "local" in which the UT 4 is permitted to communicate only through one local area or part of the satellite system network, and "global", which entitles the UT 4a to communicate through any part of the satellite mobile telephone system.

The UT 4 performs an automatic registration process, of the kind well known in the art of cellular terrestrial communications, on each occasion when the UT 4 is used for an outgoing call, when the UT 4 is switched on and periodically whilst the UT 4a is operating. As is conventional, the registration process takes the form of transmitting of a signal identifying the UT 4 (e.g. by transmitting its telephone number on a common hailing or signalling channel).

The transmitted signal is picked up by one or more of the satellites 3a, 3b. Under normal circumstances, the signal is picked up by a plurality of satellites 3a, 3b, and the received signal strength or time of arrival are transmitted, together with the identity of the UT 4 and the identity of the satellite 3a, 3b receiving the signal, to the HLR 30 via the MSSCs 22a, 22b of the SANs 1a, 1b for which the satellites 3a, 3b are in communication.

The HLR 30 calculates, on the basis of the received-signal arrival time and detected doppler effects, the terrestrial position of the UT 4 which is then stored in the UT's record. The identity of the SAN 1a, 1b, 1c most suitable for communicating with the UT 4a is also stored. This is typically found by comparing the stored position of the UT 3a with the positions of each of the SANs 1a, 1b, 1c and selecting the nearest. However, account may also or instead be taken of the strengths of the signals received via the satellites 3a, 3b, 3c, or of other factors such as network congestion which may result, in borderline cases, in the selection of a SAN 1a, 1b, 1c which is not geographically closest to the UT 4a. The identity of the allocated SAN 1a is then stored in the UTs record in the HLR 30. Once the HLR record has been updated, it is copied down to the VLR 24a of the selected SAN 1a.

Voice mail for the UT 4 is routed to the VMB 25a at the SAN 1a which is the UT's home SAN via the MSSC 22a. The voice mail can be retrieved by the UT4 via the MSSC 22a from the VMB 25a.

Figure 5:
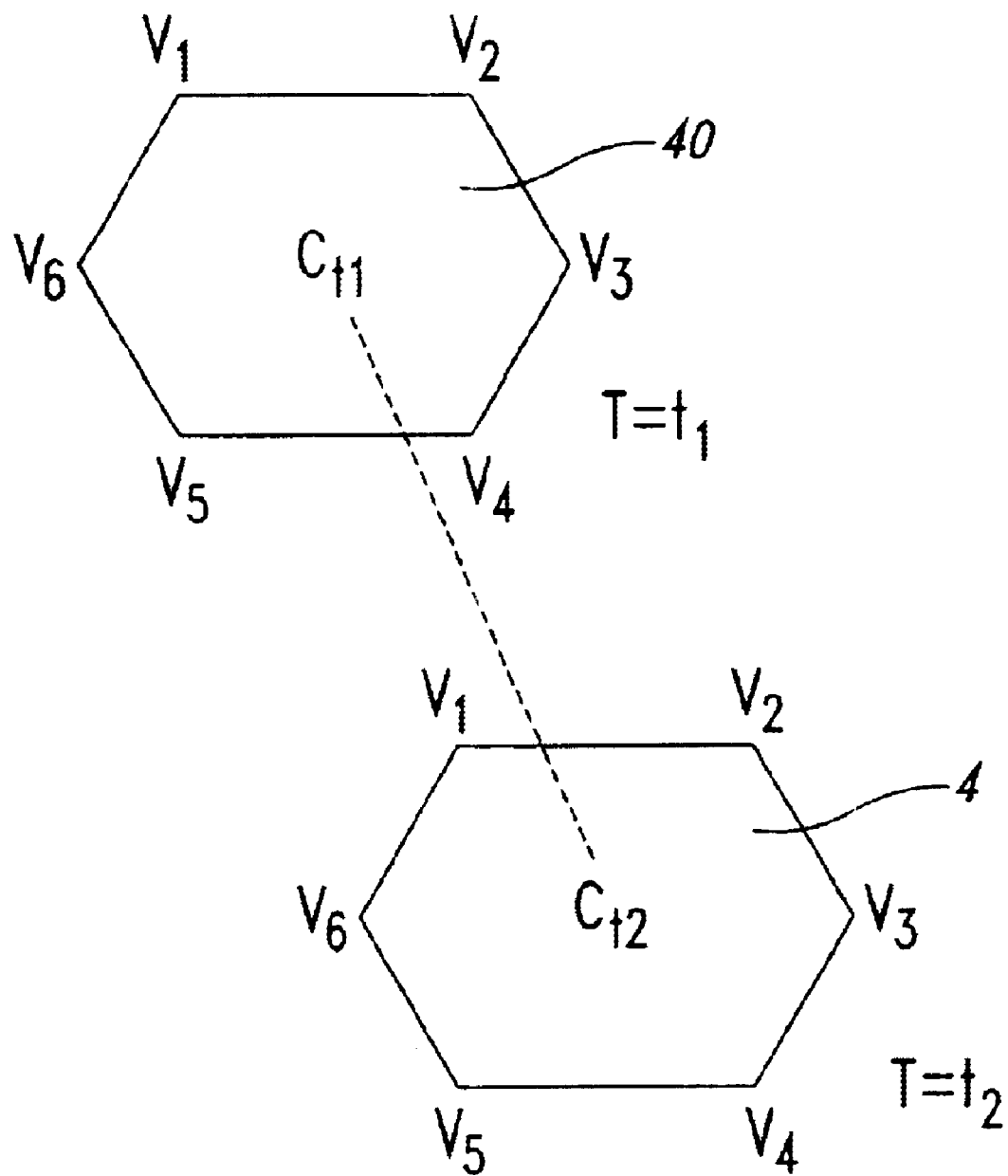
FIG. 5 illustrates the movement of a cell over the Earth's surface.

Referring to FIG. 5, as a satellite 3 orbits the Earth, a cell 40 traverses the planet's surface from a first location at time $t_1$ to a second location at time $t_2$. Consequently, a stationary UT 4 will be within the cell 40 for only a limited period of time. As the cell 40 traverses, it also rotates.

The UT 4 always knows its own position. This information is transmitted to the UT 4 by the current SAN 1. The determination of the UT's position may be performed, as mentioned above, on the basis of signal delay through one satellite 3 and the detected doppler shift. Alternatives are to determine the position of the UT on the basis of received signal delays via two or more satellites and to determine the position of the UT on the basis of doppler shifts in signal received via a plurality of satellites. The UT 4 could be combined with a receiver for a navigation system such as GPS. In this case, the network does not need to transmit to the UT 4 its position.

The SAN 1 broadcasts via the satellite 3 to the cell in a broadcast control channel (BCCH) the latitude and longitude co-ordinates Φc, Lc of the centre of the cell 40. These broadcasts take place once or twice in every minute so that a UT 4 can rapidly acquire the co-ordinates whenever it becomes active. Φc and Lc are updated every 40 minutes and are correct at a time $t_0$, 20 minutes ahead of the time when they were first broadcast. One set of latitude and longitude co-ordinates Φc, Lc is broadcast for 40 minutes, i.e. from $t_0-20$ to $t_0+20$. In practice, the UT 4 usually uses one set of co-ordinates Φc, Lc for 5 to 25 minutes because the UT 4 will generally have transferred to another cell within these time limits. However, occasionally, one set of co-ordinates Φc, Lc will be used for a longer period, up to 35 minutes.

With the satellite in a medium height orbit, a 40-minute interval spans the maximum time that a stationary UT 4 will be in one cell 40.

In addition to Φc, Lc, the satellite 3 broadcasts a set T of velocity vectors defining the translational motion of the cell centre during the present 40-minute interval, the co-ordinates of the vertices 41, . . . , 46 of the cell 40. The velocity vectors comprise X, i.e. east-west, and Y, i.e. north-south, components.

As the cell 40 moves over the Earth's surface, it rotates. The rotation of the cell 40 is defined by a set of velocity vectors R for three $V_1$, $V_2$, $V_3$ of the six vertices of the cell 40. Information regarding only three vertices is required because the cell 40 is always symmetrical and the vectors for the other three vertices $V_4$, $V_5$, $V_6$ are the vectors for vertices $V_1$, $V_2$, $V_3$ respectively but rotated through 180°.

The information required by the UT 4 is transmitted in the following format:

| | |
|---|---|
| Beam centre latitude Φc to 0.044° (5 km) | 12 bits |
| Beam centre longitude Lc to 0.044° (5 km) | 13 bits |
| T | 110 bits |
| 6 vertices | 144 bits |
| R | 90 bits |
| Epoch time ($t_0$) HH:MM:SS (BCD) | 13 bits |
| Total | 382 bits |

Figure 6:
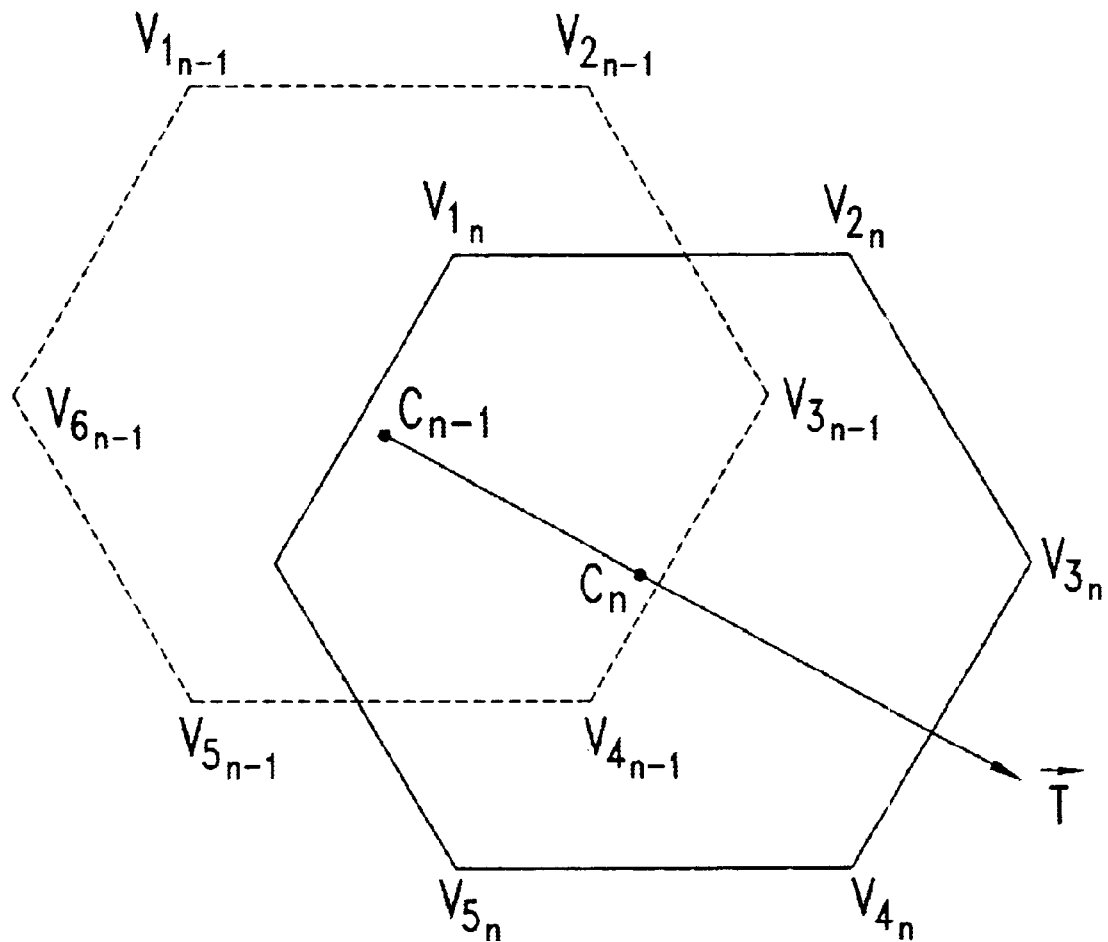
FIG. 6 illustrates the movement of a cell in one five-minute period.
Figure 7A:
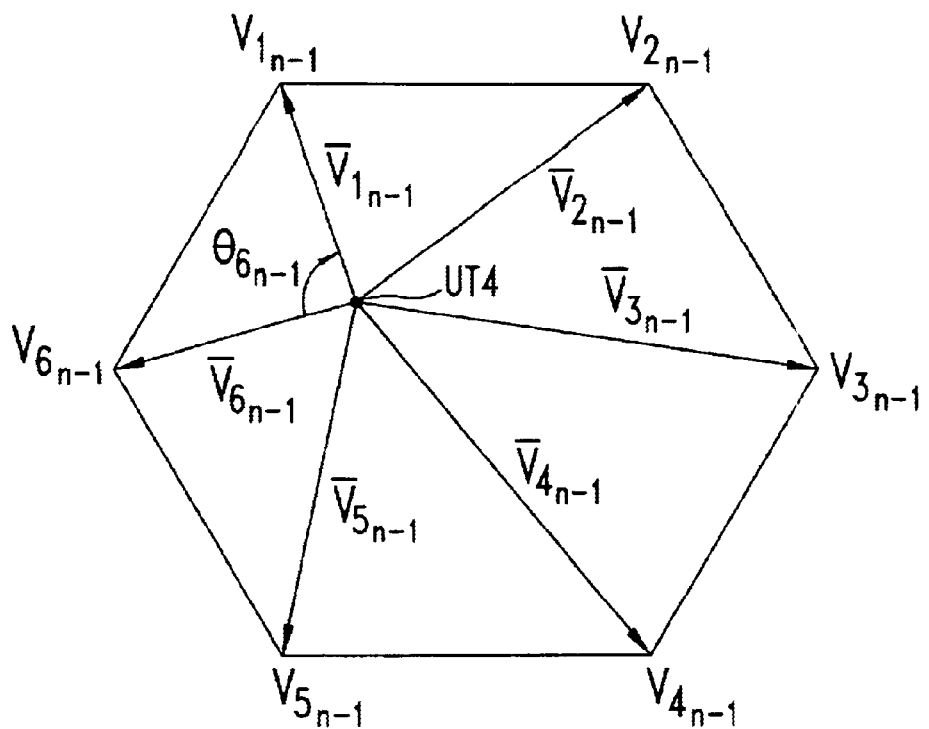
FIGS. 7(a) and (b) illustrate the position of a mobile station relative to a cell at respectively the beginning and the end of a five-minute period during which it leaves the cell.
Figure 7B:
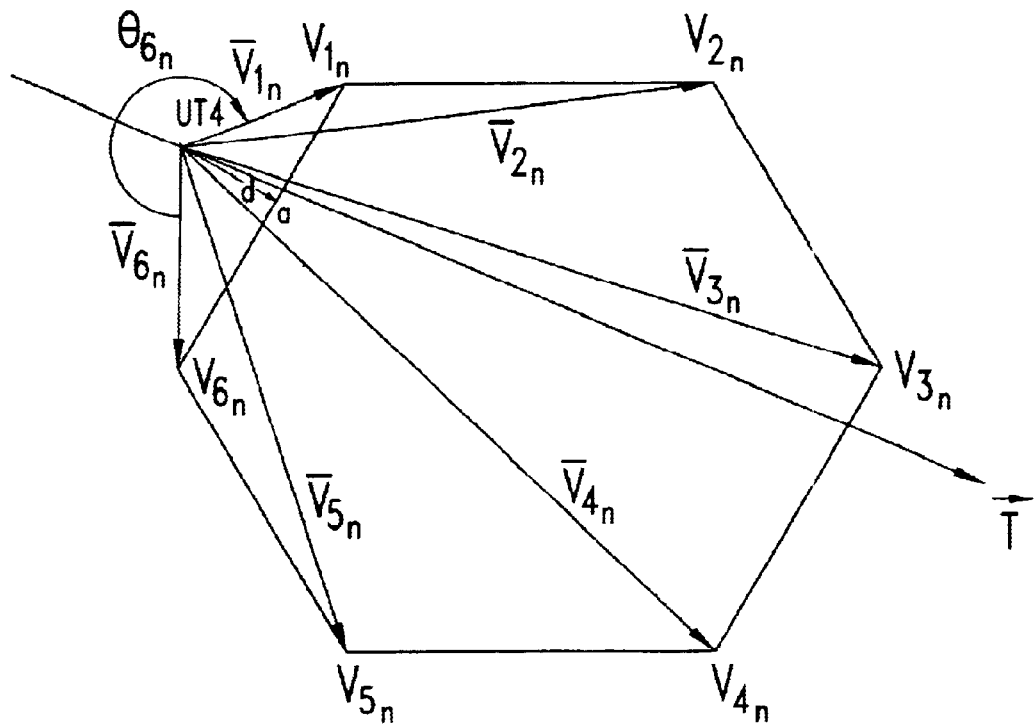
Figure 8:
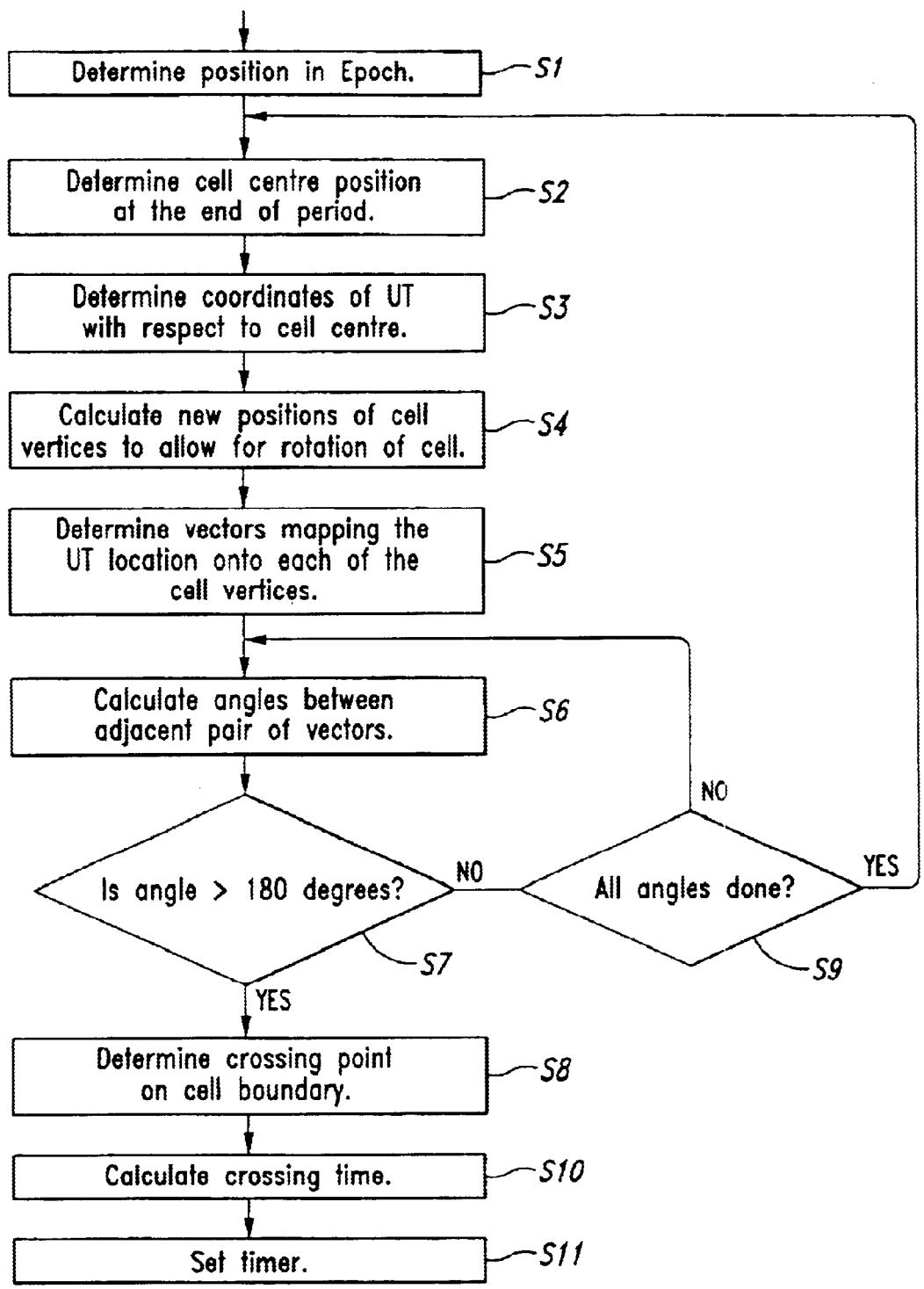
FIG. 8 is a flow chart illustrating a method of determining the time when a mobile station will leave a cell.

A method of determining when a UT 4 is within a given cell will now be described with reference to FIGS. 6, 7 and 8 and Tables 1 and 2.

TABLE 1

T vector values broadcast and used in calculations.

| Period N | Time t at the end of period, minutes from $t_0$ | (Exact) Broadcast X velocity values | X velocity used in calculations | (Exact) Broadcast Y velocity values | Y velocity used in calculations |
|---|---|---|---|---|---|
| 1 | −15 | X(−15) | X(−15) | Y(−15) | Y(−15) |
| 2 | −10 | | (X(−15) + X(−5))/2 | | (Y(−15) + Y(−5))/2 |
| 3 | −5 | X(−5) | X(−5) | Y(−5) | Y(−5) |
| 4 | 0 | X(0) | X(0) | Y(0) | Y(0) |
| 5 | 5 | X(5) | X(5) | Y(5) | Y(5) |
| 6 | 10 | | (X(15) + X(5))/2 | | (Y(15) + Y(5))/2 |
| 7 | 15 | X(15) | X(15) | Y(15) | Y(15) |
| 8 | 20 | | X(15) | | Y(15) |

TABLE 2

R vector values broadcast and used in calculations.

| Period N | Time t at end of period, minutes from $t_0$ | (Exact) Broadcast X velocity | X velocity used in calculations | (Exact) Broadcast Y velocity values | Y velocity used in calculations |
|---|---|---|---|---|---|
| 1 | −15 | X(−15) | X(−15) | Y(−15) | Y(−15) |
| 2 | −10 | | X(−15) | | Y(−15) |
| 3 | −5 | | X(0) | | Y(0) |
| 4 | 0 | X(0) | X(0) | Y(0) | Y(0) |
| 5 | 5 | | X(0) | | Y(0) |
| 6 | 10 | | X(15) | | Y(15) |
| 7 | 15 | X(15) | X(15) | Y(15) | Y(15) |
| 8 | 20 | | X(15) | | Y(15) |

The velocity values are in km/min.

When the UT 4 first becomes active in a cell 40, its controller performs the following method:

1. At step s1, the UT 4 determines the present time within the current 40-minute interval.
2. Once the present time has been determined, the UT 4 calculates the latitude and longitude of the cell centre C at the end of the current five-minute period, step s2 and at the end of each period until the UT 4 leaves the cell 40. The latitude of the cell centre can be determined at the end of the nth period using the equation:

$$\Phi_{Cn} = \Phi_{C4} + \sum_{N=0}^{n} X_N \cdot 0.045 \quad (1)$$

where $X_N$ is the approximated X velocity value from Table 1 for the cell for the Nth five-minute period, $\Phi_{C4}$ is the latitude of the cell 40 when t=0, i.e. at the end of the fourth period, and $\Phi_{Cn}$ is the latitude value at the end of the nth five-minute period.

The longitude of the cell can be similarly calculated for each five-minute period from the current time until it is determined that the UT 4 would be outside the cell 40 using the equation:

$$L_{Cn} = L_{C4} + \sum_{N=0}^{n} Y_N \cdot 0.045 \quad (2)$$

where $Y_N$ is the approximated Y velocity value from Table 1 for the cell for the Nth five-minute period, $L_{C4}$ is the longitude when t=0, and $L_{Cn}$ is the longitude value at the end of the nth five-minute period.

In practice the $\Phi_{Cn}$ and $L_{Cn}$ values are accumulated and in all but the initial calculation, so that if further calculations are required in the present interval the following equations are used instead of Equations (1) and (2):

$$\Phi_{Cn} = \Phi_{C(n-1)} + X_n 0.045$$

and $$L_{Cn} = L_{C(n-1)} + Y_n 0.045$$

Since, the position of the cell centre C at the middle of the 40-minute interval is transmitted in the BCCH, the cell velocity vectors for periods 1 to 4 must be rotated by 180° either before or after being broadcast.

3. After each calculation of cell centre C latitude and longitude, it is necessary to determine whether the UT 4 is outside the cell 40. This is carried out in the following manner:
   a) First, at step s3, the Cartesian co-ordinates ($X_{UT}$, $Y_{UT}$) of the UT 4 relative to the cell centre are calculated. Although a cell exists on a spherical surface, usable results can be obtained by treating the cell as being flat. The UT 4 calculates its Cartesian co-ordinates using the following approximate equations:

$$x_{UT} = 111.32 \cdot (L_{UT} - L_{Cn}) \cdot \cos \Phi_{UT} \quad (3)$$

and $$y_{UT} = 111.32 \cdot [(\Phi_{UT} - \Phi_{Cn}) + 7.83 \cdot 10^{-5} \cdot x_{UT}(L_{UT} - L_{Cn}) \sin \Phi_{Cn}] \quad (4)$$

where $L_{UT}$ and $\Phi_{UT}$ are the longitude and latitude of the UT 4. The UT 4 is informed of its longitude and latitude each time it performs an update with the network. (111.32 is the great circle distance on the Earth's surface in km corresponding to an angular separation of 1°).

Above about 65° latitude, the errors arising from the use of Equations (3) and (4) increases. Suitable approximate expressions for use beyond 65° latitude north or south are:

$$x_{UT} = 111.32 \cdot (90 - \Phi_{UT}) \cdot \sin(L_{UT} - L_{Cn})$$

and $$y_{UT} = 111.32 \cdot [\Phi_{UT} \cos(L_{UT} - L_{Cn}) - \Phi_{Cn} + 90(1 - \cos(L_{UT} - L_{Cn}))]$$

b) Since the cell rotates as it traverses, it is necessary to determine the co-ordinates of the vertices $V_1 \ldots V_6$ of the cell 40. This is performed in step s4. The R values in Table 2 are used for these calculations which employ initially the equations:

$$x_{V_{jN}} = x_{V_{j4}} \cdot \sum_{N=0}^{n} Xj_N \cdot 0.045 \text{ and} \quad (5)$$

$$y_{V_{jN}} = y_{V_{j4}} + \sum_{N=0}^{n} Yj_N \cdot 0.045 \quad (6)$$

where $x_{V_{jN}}$ and $y_{V_{jN}}$ are the co-ordinates of the jth vertex at the end of the Nth five-minute period and $X_{jN}$ and $Y_{jN}$ are the R vector values from Table 2 for the jth vertex.

However, as in the case of the cell centre position, the $x_{V_{jN}}$ and $y_{V_{jN}}$ are accumulated and similar simplified equations are used for subsequent calculations.

c) At step s5, the vectors $v_{1N} \ldots v_{6N}$ mapping the UT's position onto each of the vertices are derived, thus:

$$\bar{v}_{jN} = (x_{V_{jN}} - x_{UT})\bar{x} + (y_{V_{jN}} - y_{UT})\bar{y} \quad (7)$$

where x and y are orthogonal unit vectors.

d) At step s6, the angles $\theta_{jN}$, in a consistent direction, between adjacent vectors $v_1 \ldots v_6$ are calculated and, if the calculated angle is greater than 180°, the UT 4 must be outside the cell 40. The angle between adjacent vectors is determined using the following equation:

$$\theta_{jN} = \tan^{-1}\left(\frac{x_{V_{jN}}}{y_{V_{jN}}}\right) - \tan^{-1}\left(\frac{x_{V(j-1)N}}{y_{V(j-1)N}}\right) \quad (8)$$

If j=1 then j−1 is replaced by 6. There is a real possibility of a divide by zero error occurring here so special care must be taken to check the values of the divisors before performing the divisions.

The appropriate angle obtained from $\tan^{-1}(x/y)$ can be selected on the basis of the signs of x and y. If $\theta_{jN}$ is negative, then the equivalent positive angle should be used, i.e. $360° + \theta_{jN}$.

An arctan lookup table may be stored in the UT controller's ROM to avoid the need to calculate these values. By including an indication of the signs of the x and y values in the lookup table addressing scheme, the lookup table can further reduce the burden on the UT controller's microprocessor.

If an angle $\theta_{jN}$ is determined to be greater than or equal to 180° (step s7), the process moves directly to step s8. If this is not the case, it is determined whether all the angles have been tested at step s9. If all the angles have been tested, the process returns to step s2 otherwise the process returns to step s6 and next angle is tested.

In practice, the motion of the cell 40 may mean that the UT 4 will leave the cell 40 via one of a subset of edges, assuming the UT 4 is stationary. If this is the case, the number of vectors $v_n$ can be reduced. However, the presently described algorithm has the advantage of universality.

4. Once the five-minute period, during which the UT 4 leaves the cell has been identified, a more closely approximate time for the UT's departure can be calculated.

The first stage of this process is to determined the point on the cell's boundary which passes through the location of the UT 4 (step s8). The edge linking the vectors $v_n$, $v_{n-1}$, separated by 180° or more, is the edge that passes through the UT's position. If the angle $\theta_{jN}$ was determined to be 180°, no further calculations are necessary because this condition means that the UT 4 will leave the cell 40 at the boundary between two five-minute periods.

The rotation of the cell can be ignored for this calculation. The x co-ordinate of the crossing point $x_X$ is obtained from:

$$x_X = \left(y_{UT} - \frac{X_N}{Y_N} \cdot x_{UT}\right) - \left(y_{Vj_N} - \frac{(y_{Vj_N} - y_{V(j-1)_N}) \cdot x_{Vj_N}}{(x_{Vj_N} - x_{V(j-1)_N})}\right) \quad (9)$$

The y co-ordinate $y_X$ is then be obtained from:

$$y_X = \frac{X_N}{Y_N} \cdot x_X + \left(y_{UT} - \frac{X_N}{Y_N} \cdot x_{UT}\right) \quad (10)$$

where $X_N$ and $Y_N$ are the cell velocity vector components (Table 1) for the five-minute period during which the UT 4 will leave the cell 40.

The co-ordinates of the UT 4 and the crossing point are then used at step s10 to calculate the time for the crossing from:

$$t_X = t_N - \frac{\left(\sqrt{(x_{UT} - x_X)^2 + (y_{UT} - y_X)^2}\right)}{\sqrt{X_N^2 + Y_N^2}} \quad (11)$$

where $t_N$ is the time at the end of the five-minute period during which the UT 4 will leave the cell 40.

A preferred method of determining when a UT 4 will leave a cell will now be described with reference to Tables 3 and 4.

TABLE 3

T vector values broadcast and used in calculations.

| Period N | Time t at the centre of period, minutes from $t_0$ | (Exact) Broadcast X velocity | X velocity used in calculations | (Exact) Broadcast Y velocity | Y velocity used in calculations |
|---|---|---|---|---|---|
| 1 | −20 | | X(−10) | | Y(−10) |
| 2 | −15 | | (X(−10) + X(−5))/2 | | (Y(−10) + Y(−5))/2 |
| 3 | −10 | X(−10) | X(−5) | Y(−10) | Y(−5) |
| 4 | −5 | X(−5) | (X(−5) + X(0))/2 | Y(−5) | (Y(−5) + Y(0))/2 |
| 5 | 0 | X(0) | X(0) | Y(0) | Y(0) |
| 6 | 5 | X(5) | (X(0) + X(5))/2 | Y(5) | (Y(0) + Y(5))/2 |
| 7 | 10 | X(10) | X(5) | Y(10) | Y(5) |

TABLE 3-continued

T vector values broadcast and used in calculations.

| Period N | Time t at the centre of period, minutes from $t_0$ | (Exact) Broadcast X velocity | X velocity used in calculations | (Exact) Broadcast Y velocity | Y velocity used in calculations |
|---|---|---|---|---|---|
| 8 | 15 | | (X(5) + X(10))/2 | | (Y(5) + Y(10))/2 |
| 9 | 20 | | X(10) | | Y(10) |

TABLE 4

R vector values broadcast and used in calculations.

| Period N | Time t at centre of period, minutes from $t_0$ | (Exact) Broadcast X velocity | X velocity used in calculations | (Exact) Broadcast Y velocity | Y velocity used in calculations |
|---|---|---|---|---|---|
| 1 | −20 | | X(−15) | | Y(−15) |
| 2 | −15 | X(−15) | X(−15) | Y(−15) | Y(−15) |
| 3 | −10 | | X(−15) | | Y(−15) |
| 4 | −5 | | X(0) | | Y(0) |
| 5 | 0 | X(0) | X(0) | Y(0) | Y(0) |
| 6 | 5 | | X(0) | | Y(0) |
| 7 | 10 | | X(15) | | Y(15) |
| 8 | 15 | X(15) | X(15) | Y(15) | Y(15) |
| 9 | 20 | | X(15) | | Y(15) |

The velocity values are in km/min.

In this embodiment, the control program stored in the UT, controller's ROM is different.

Figure 9:
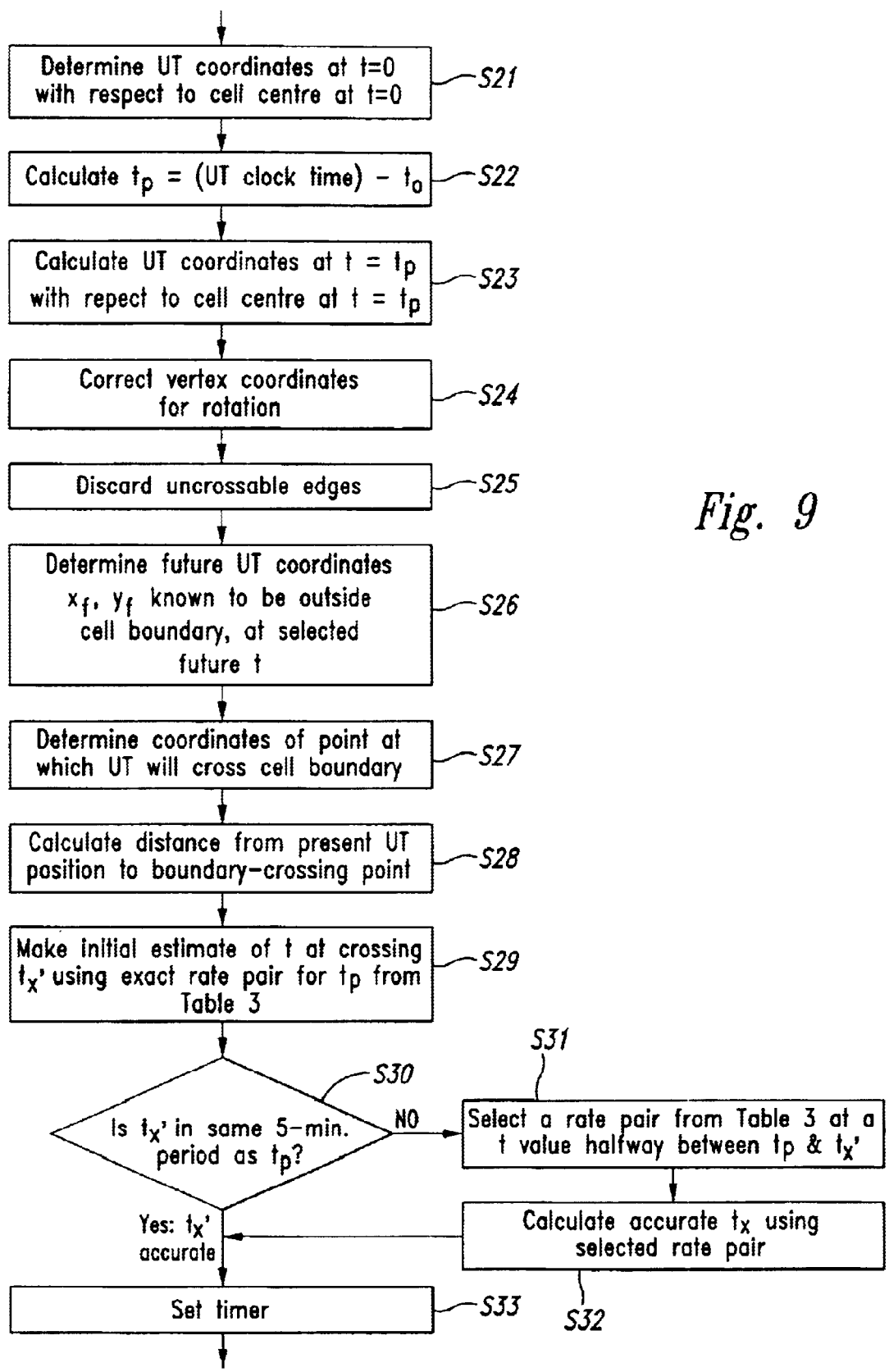
FIG. 9 is a flow chart illustrating a preferred method of determining the time when a mobile station will leave a cell.

Referring to FIG. 9, when a UT 4 receives the broadcast information, the information is processed by its controller in the following manner:

1. At step s21, the Cartesian co-ordinates ($x_{UT0}$, $y_{UT0}$) of the UT 4 relative to the cell centre at t=0 are calculated. Although a cell exists on a spherical surface, usable results can be obtained by treating the cell as moving over a flat surface. The UT 4 calculates its Cartesian co-ordinates using the following approximate equations:

$$x_{UT0} = 111.32 \cdot (L_{UT} - L_C) \cdot \cos \Phi_{UT} \quad (12)$$

and $$y_{UT0} = 111.32 \cdot [(\Phi_{UT} - \Phi_C) + 7.83 \cdot 10^{-5} \cdot x_{UT0}(L_{UT} - L_C)\sin \Phi_C] \quad (13)$$

where $L_{UT}$ and $\Phi_{UT}$ are the longitude and latitude of the UT 4. The UT 4 is informed of its longitude and latitude each time it performs an update with the network. (111.32 is the great circle distance on the Earth's surface in km corresponding to an angular separation of 1°).

Above about 65° latitude, the errors arising from the use of Equations (12) and (13) increases. Suitable approximate expressions for use beyond 65° latitude north and south are:

$$x_{UT0} = 111.32 \cdot (90 - \Phi_{UT}) \cdot \sin(L_{UT} - L_C)$$

and $$y_{UT0} = 111.32 \cdot [\Phi_{UT} \cdot \cos(L_{UT} - L_C) - \Phi_C + 90(1 - \cos(L_{UT} - L_C))]$$

2. At step s22, the present time $t_p$ with respect to $t_0$ is calculated as the difference between the UT's clock time and the broadcast value of the epoch time $t_0$.

3. At step s23, the Cartesian co-ordinates ($x_{UT}$, $y_{UT}$) of the UT 4 relative to the cell centre at $t=t_p$ are calculated using:

$$x_{UT} = x_{UT0} - X_{TN} \cdot t_p \quad (14)$$

and $$y_{UT} = y_{UT0} - Y_{TN} \cdot t_p \quad (15)$$

where $X_{TN}$ and $Y_{TN}$ are values selected from Table 3 based in $t_p$. Though in fact it is the cell vertices and cell centre that translate over the Earth while the UT 4 remains stationary (hence the minus signs in Equations (14) and (15)), the computations in step s23 and after are simpler and the maximum coordinate values smaller if the cell provides the reference frame for the coordinates.

4. At step s24, the coordinates of the vertices of the cell 40 with respect to the centre of the cell 40 are corrected for cell rotation as follows:

$$x_{Vnt} = x_{Vn0} + X_{RN} \cdot t_p \quad (16)$$

and $$y_{Vnt} = y_{Vn0} + Y_{RN} \cdot t_p \quad (17)$$

where $t_p$ is the present time with respect to $t_0$, $x_{Vnt}$ and $y_{Vnt}$ are the x and y co-ordinates of the nth vertex at time $t=t_p$, $x_{Vn0}$ and $y_{Vn0}$ are the x and y co-ordinates of the nth vertex at $t=t_0$ (i.e. as broadcast), and $X_{RN}$ and $Y_{RN}$ are values selected from Table 4 on the basis of $t_p$.

5. The cell 40 motion always has a positive X (i.e. eastwards) component. Accordingly, it can be inferred that the UT 4 cannot be crossed by a cell edge whose ends are both east of the UT 4. Similarly, edges of the cell 40 to the north and the south of the UT 4 can be ignored when the cell 40 is moving northwards (+Y) or southwards (-Y) respectively. Therefore, at step s25, the edges of the cell 40, which cannot pass the UT 4, are discarded for the purposes of further calculations.

6. The handover point $x_x$, $y_x$ is on the intersection between two lines: one connecting two vertices, $V_a$ and $V_b$, and another connecting the present UT position $x_{UT}$,$y_{UT}$ with a future UT position $x_f$, $y_f$ selected to be outside the cell. At step s26, selecting the time to $x_f$, $y_f$ (with distances calculated from the X and Y values applicable halfway there) can be done in any of at least three ways: use a worst-normal-case value of 25 minutes; use a value specific to the maximum diameter of each of the cell types, from a lookup table (the cell type broadcast on BCCH); or use a trial value and iterate if necessary.

7. The coordinates $x_X$ and $y_X$ are calculated using:

$$x_X = \frac{\left(\frac{y_f - y_{UT}}{x_f - x_{UT}}\right) \cdot x_{UT} - \left(\frac{y_{Vb} - y_{Va}}{x_{Vb} - x_{Va}}\right) \cdot x_{Va} + y_{Va} - y_{UT}}{\left(\frac{y_f - y_{UT}}{x_f - x_{UT}}\right) - \left(\frac{y_{Vb} - y_{Va}}{x_{Vb} - x_{Va}}\right)} \quad (18)$$

and $$y_X = \left(\frac{y_f - y_{UT}}{x_f - x_{UT}}\right)(x_X - x_{UT}) + y_{UT} \quad (19)$$

For the calculated handover point to be valid, the following conditions must be met:

$$x_f \leq x_X \leq x_{UT}$$

$$x_{Va} \leq x_X \leq x_{Vb}$$

$$y_f \leq y_X \leq y_{UT}$$

$$y_{Va} \leq y_X \leq y_{Vb}$$

If these conditions are not met, another vertex pair or a new future point $x_f$, $y_f$ must be chosen.

8. At step s28, the distance from the present UT position to the future boundary-crossing point is calculated using:

$$R_X = \sqrt{(x_{UT} - x_X)^2 + (y_{UT} - y_X)^2} \quad (20)$$

9. At step s29, an initial estimate $t_x'$ of the time at boundary-crossing with respect to $t_0$ is calculated using:

$$t_x' = \frac{R_X}{\sqrt{X_p^2 + Y_p^2}} \quad (21)$$

in which $X_p$ and $Y_p$ are the exact broadcast velocities for the period in which $t_p$ falls, selected from Table 3 according to the value of $t_p$.

If $|t_p|>12.5$ minutes, Table 3 shows that no exact $X_p$ and $Y_p$ are broadcast. In such cases, the X and Y values for + and –10 minutes can be used to calculate $t_x'$. In the presently described system, these cases occur only in the extended fringe of the coverage are (i.e. below 10° elevation in beams at the edge of the area covered by one satellite), the resulting loss of accuracy is acceptable. In all but edge beams, the coordinate update period could be reduced from the nominal maximum of 40 minutes to 20 or 25 minutes so that in all cases $|t_p|<12.5$ minutes. Alternatively, the $X_p$ and $Y_p$ values for $|t_p|<12.5$ minutes could be broadcast in edge beams.

10. If $t_x'$ is in the same five-minute period as $t_p$, then $X_p$ and $Y_p$ are sufficiently accurate and, therefore, $t_x'$ is also sufficiently accurate. At step s30, a test for this condition is made; if it exist steps s31 and s32 are bypassed and, at step s33, a timer is set to wake up the UT 4 one minute before the predicted crossing time (if $t_x'-t_p$ is not already less than one minute). This procedure gives an immediate result when a crossing is imminent.

11. If $t_x'$ is not in the same five-minute period as $t_p$, then at steps s31, a rate pair $X_H$ and $Y_H$ are selected from Table 3 at a time halfway between $t_p$ and $t_x'$ to the nearest five minutes. This selection process is illustrated by Table 5 below.

At step s32, the rate pair thus selected is then used to calculate a more accurate value of crossing tim $t_x$ using:

$$t_x' = \frac{R_X}{\sqrt{X_p^2 + Y_p^2}} \quad (22)$$

Although the initial crossing-time estimate $t_x'$ may not be as accurate as is required, its accuracy is sufficient to select $X_H$ and $Y_H$ for calculating $t_X$ with a useful degree of accuracy. Once $t_X$ has been calculated, the program flow moves on to step s33.

TABLE 5

| $t_X'$, initial estimated crossing time | Period N | Time t at the centre of period, minutes from $t_p$ | X velocity $X_H$ used to calculate accurate $t_X$ | Y velocity $Y_H$ used to calculate accurate $t_X$ |
|---|---|---|---|---|
| −7.5 to −2.5 | 4 | −5 | X(−5) | Y(−5) |
| −2.5 to 2.5 | 5 | 0 | (X(−5) + X(0))/2 | (Y(−5) + Y(0))/2 |
| 2.5 to 7.5 | 6 | 5 | X(0) | Y(0) |
| 7.5 to 12.5 | 7 | 10 | (X(0) + X(5))/2 | (Y(0) + Y(5))/2 |
| 12.7 to 17.5 | 8 | 15 | X(5) | Y(5) |
| 17.5 to 22.5 | 9 | 20 | (X(5) + X(10))/2 | (Y(5) + Y(10))/2 |

Figure 10:
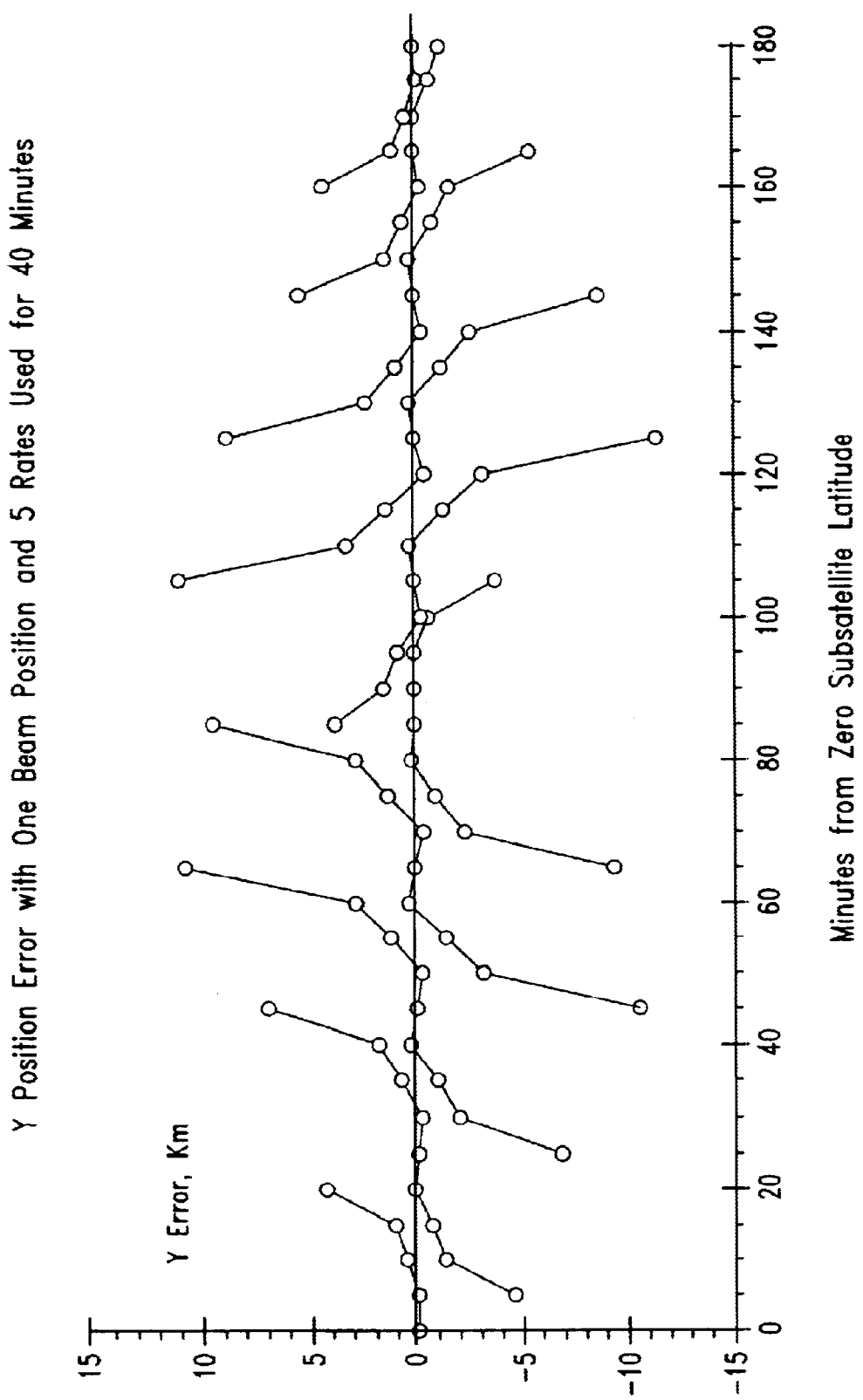
FIG. 10 is a graph showing errors resulting from approximations used in the second method.

It is clear that a number of approximations have been used in the calculation of $t_X$. However, the errors induced by the use of these approximations do not produce a significantly adverse effect as shown by FIG. 10. The small size of the errors shown in FIG. 10 demonstrate that the technique of using only one rate value accurate at a time halfway between that of a known position and that when a new position estimate is wanted gives small position errors with quite simple equations, such as Equations (14) and (15).

Having calculated a predicted time for leaving a cell, by whatever method, the UT 4 operates as follows.

Figure 11:
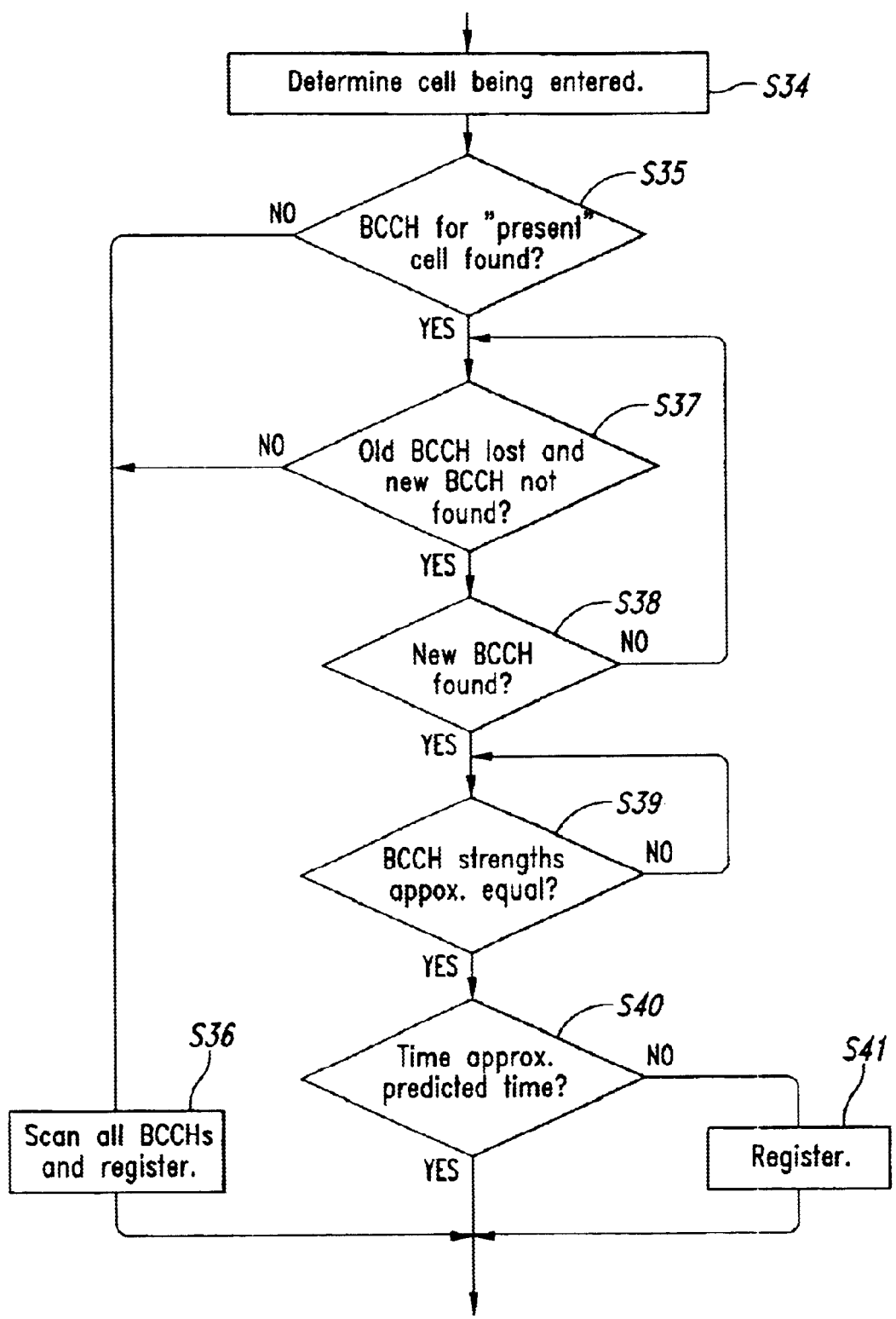
FIG. 11 is a flow chart illustrating the operation of the mobile station at the predicted cell departure time.

Referring to FIG. 11, when the UT 4 is woken up by the timer, it first identifies the cell it should now be entering using its knowledge of the cell edge through which it predicted that it would pass and an internal map of relative cell positions (step s34).

Once the UT 4 has woken up, it scans the BCCH frequencies for the cell it is leaving and the cell it expects to be entering (step s35). If initially, the BCCH for the current cell is not received, the UT 4 determines that it has moved and starts scanning all BCCH frequencies to determine which it should now use and then performs a registration routine, as hereinbefore described, with the network (step s36).

If the BCCH for the current cell 40 is found, the UT 4 monitors the BCCH frequency for the current cell and the BCCH frequency for the cell it expects to be entering, until the BCCH for the new cell is detected or the BCCH for the current cell is lost (steps s37 and s38). If the BCCH for the current cell is lost without the BCCH for the new cell appearing, the UT 4 determines that it has moved and scans all BCCH frequencies to determine which it should now use and then performs a registration routine with the network (step s36). At step s39, the signal strengths of the BCCH's are compared until they are approximately equal. If the time when the two BCCH's have the same strength differs significantly from the predicted departure time (step s40), the UT 4 determines that it has moved and re-registers (step s41) so that the network becomes aware of its new location. The approximations and assumptions used in the cell departure predictions will generally result in some difference between the predicted and actual departure times. However, if the difference is greater than some amount, determined by the details of the particular system, it can be safely assumed that the UT 4 has moved.

If the BCCH for the expected new cell is received as expected, the UT 4 does not perform a registration routine with the network.

It is not necessary for the UT 4 to re-register on entering a cell as expected because the network knows both the position of the UT 4 and the position at any given time of all of the beams. Consequently, the correct beam can be selected for signalling to the UT 4 even if it has not re-registered for some time.

Since, a stationary UT does not need to re-register on entering a new cell, there is a reduction in the demand for system resources for administrative purposes.

When the UT 4 enters a new cell, it receives the cell position and movement data for the new cell, repeats the calculations set out above and re-enters its dormant state.

It will be appreciated that many modifications may be made to the above-described embodiments. For example, the period and interval durations may be different. It may be found that it is sufficient to determine the period during which the UT leaves a cell and wake up the UT at the start of that period.

Additional information could be transmitted to the UT. For example, in order to reduce the burden on the UT's controller, the values for cos $\Phi_{UT}$ could be sent to the UT with its location. Also, $7.83 \times 10^{-5}$ sin $\Phi_C$ could be broadcast in the BCCH.

The skilled person will also appreciate that the present invention may be embodied using other co-ordinate systems, e.g. spherical polar co-ordinates, and that the cell translation and rotation may be described as linear functions of time, in which case the UT need only know the constants of the linear functions for the current cell to determine the current cell's position at any time.

What is claimed is:

1. A method of operation of a satellite mobile telephone system in which a plurality of cells move across the surface of the Earth as a satellite orbits, the method comprising the steps of:

providing a mobile station with information related to the movement of a cell relative to the Earth's surface, including rotational movement of the cell; and while the mobile station is not in a call, determining at the mobile station a prediction for the time when the mobile station will leave said cell on the basis of said received information; and waiting for a period set in dependence on said prediction and then starting to perform a cell selection operation.

2. A method according to claim 1, wherein said information is provided to the mobile station by broadcasting the information defining the geographical position of a cell from a satellite to that cell, and receiving said information for the cell at the mobile station.

3. A method according to claim 1, wherein said information includes information regarding the extent of the cell.

4. A method according to claim 1, wherein said information includes information regarding the traversing of the cell over the Earth's surface.

5. A method according to claim 1, comprising the step selecting at the mobile station a control channel to be monitored on the basis of said prediction.

6. A method according to claim 1, comprising the step of determining at the mobile station the correctness of said prediction and performing a network registration process for the mobile station in dependence on said determined correctness.

7. A method as in claim 1 wherein said determining step is performed when the mobile station is in an idle mode at a time when no active telephone call is being made.

8. A method of operation of a satellite mobile telephone system in which a plurality of cells move across the surface of the Earth as a satellite orbits, the method comprising the steps of:

providing a mobile station with information related to the movement of a cell relative to the Earth's surface; and while the mobile station is not in a call,
  determining at the mobile station a prediction for the time when the mobile station will leave said cell on the basis of said received information,
  waiting for a period set in dependence on said prediction and then starting to perform a cell selection operation,
  wherein said cells rotate in their plane as they move across the surface of the Earth and said information includes information regarding rotational movement of the cell in its own plane.

9. A method according to claim 8, wherein said information comprises latitude and longitude co-ordinate values for the centre of the cell, a vector defining the traversing of the cell over the surface of the Earth, co-ordinate values for the vertices of the cell relative to the centre of the cell, at least one vector value defining rotation of the cell as it traverses the surface of the Earth and a time value.

10. A method according to claim 9, wherein said information comprises a set of translational vectors defining the traversing of the cell over the surface of the Earth during predetermined sub-periods of a period during which said information remains unchanged.

11. A method according to claim 10, wherein the mobile station predicts the sub-period during which it will leave the cell on the basis of the members of said set of translational vectors.

12. A method according to claim 11, wherein said information comprises a set of vectors defining the rotation of the cell and the mobile station predicts the sub-period during which it will leave the cell on the basis of said set of rotational vectors.

13. A method according to claim 11, wherein the mobile station predicts the time within said predicted sub-period when it will leave the cell.

14. A method according to claim 8, further comprising:
  waiting for a period set in dependence on said prediction and then starting to perform a cell selection operation.

15. A mobile telephone for a satellite mobile telephone system, including memory means for storing control data including geographical information related to the movement, including rotational movement, of a cell across the Earth's surface and processing means configured for processing said information to make a prediction of when the mobile station will depart the current cell, and, while not in a call, waiting for a period set in dependence on said prediction and then starting to perform a cell selection operation.

16. A mobile telephone according to claim 15, including receiving means for receiving said geographical data, wherein said data relates to the cell in which the mobile station is located.

17. A mobile telephone according to claim 15, wherein the processing means is configured to predict a cell departure time for the mobile station on the basis of the members of a set of translational vectors comprised in said information and defining the traversing of the cell over the surface of the Earth.

18. A mobile telephone according to claim 17, wherein the processing means is configured to predict a sub-period, during which the mobile telephone will leave the cell, of a period, during which the broadcast geographical information remains unchanged.

19. A mobile telephone according to claim 18, wherein the processing means is configured to predict the time within said predicted sub-period when the mobile station will leave the cell.

20. A mobile telephone according to claim 15, wherein the processing means is configured to determine the error between the predicted and actual cell departure times and, only if said error is greater than a predetermined value, cause the mobile telephone to transmit network registration request signals.

21. A mobile telephone as in claim 15 including means for performing said prediction when the mobile station is in an idle mode at a time when no active telephone call is being made.

22. A mobile telephone for a satellite mobile telephone system, including memory means for storing control data including geographical information related to the movement of a cell across the Earth's surface and processing means for processing said information to make a prediction of when the mobile station will depart the current cell,
  wherein the processing means is configured to predict a cell departure time for the mobile station on the basis of the members of a set of translational vectors comprised in said information and defining the traversing of the cell over the surface of the Earth, and
  wherein said cells rotate in their own planes as they move across the surface of the Earth and the processing means is configured to predict the cell departure time on the basis of a set of vectors comprised in said information and defining the rotation of the cell in its own plane.

23. A mobile telephone according to claim 22, wherein said processing means is further configured to wait for a period set in dependence on said prediction and then start to perform a cell selection operation.

24. A mobile radio communication apparatus comprising: a memory for storing control data including information related to the movement of a cell across the Earth's surface, including information regarding cell rotation;
  a processor programmed to calculate, based on the stored information, a predicted time that the mobile radio communication apparatus will leave a cell in which it is currently located, to set an idle mode timer for an idle mode of the processor based on the predicted time, and to start to perform a cell selection operation when the processor is awakened by the timer.

25. The mobile radio communication apparatus according to claim 24, wherein the information comprises latitude and longitude co-ordinate values for the center of the cell, a vector defining the traversing of the cell over the surface of the Earth, co-ordinate values for the vertices of the cell relative to the center of the cell, at least one vector value defining rotation of the cell as it traverses the surface of the Earth and a time value.

26. A method of operation of a satellite mobile telephone system in which a plurality of cells move across the surface of the Earth as a satellite orbits, the method comprising the steps of:
  providing a mobile station with information, including rotational information, related to the movement of a cell relative to the Earth's surface; and
  while the mobile station is not in a call,
  determining at the mobile station a prediction for the time when the mobile station will leave said cell on the basis of said received information; and
  waiting for a period set in dependence on said prediction and then determining a new cell to select and starting a selection operation to select that new cell.

* * * * *